US012005682B2

United States Patent
Tsai

(10) Patent No.: US 12,005,682 B2
(45) Date of Patent: Jun. 11, 2024

(54) COMPOSITE LAMINATE CARDS OF FINITE SIZE, TAPERED COMPOSITE LAMINATE STRUCTURES FORMED FROM THE SAME, AND METHODS OF MANUFACTURING AND USING THE SAME

(71) Applicant: The Board of Trustees of the Leland Stanford Junior University, Stanford, CA (US)

(72) Inventor: Stephen W. Tsai, Honolulu, HI (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 17/798,513

(22) PCT Filed: Mar. 18, 2021

(86) PCT No.: PCT/US2021/022943
§ 371 (c)(1),
(2) Date: Aug. 9, 2022

(87) PCT Pub. No.: WO2021/188783
PCT Pub. Date: Sep. 23, 2021

(65) Prior Publication Data
US 2023/0075583 A1 Mar. 9, 2023

Related U.S. Application Data

(60) Provisional application No. 62/991,411, filed on Mar. 18, 2020.

(51) Int. Cl.
*B32B 3/02* (2006.01)
*B29C 70/30* (2006.01)
(Continued)

(52) U.S. Cl.
CPC ............... *B32B 27/08* (2013.01); *B32B 3/10* (2013.01); *B32B 2250/44* (2013.01); *B32B 2307/732* (2013.01)

(58) Field of Classification Search
CPC .......... B32B 27/08; B32B 27/12; B32B 3/02; B32B 5/02; B32B 2260/046;
(Continued)

(56) References Cited

U.S. PATENT DOCUMENTS 5,069,318 A * 12/1991 Kulesha .................... F16F 7/12
188/377
6,641,893 B1 11/2003 Sursesh et al.
(Continued)

FOREIGN PATENT DOCUMENTS

EP  0396281 A2  11/1990
FR  3012764 A1  5/2015
(Continued)

OTHER PUBLICATIONS

International Search Report and Written Opinion for International Application No. PCT/US2021/022943, dated Jul. 6, 2021, (10 pages), Korean Intellectual Property Office, Daejeon, Republic of Korea.
(Continued)

*Primary Examiner* — Joanna Pleszczynska
(74) *Attorney, Agent, or Firm* — Alston & Bird LLP

(57) ABSTRACT

Described are various dual-tapered composite laminate structures. These structures may comprise a plurality of finite sub-laminate cards, each one of the plurality of cards having the same shape and size as the other ones of the plurality of cards and having opposing surfaces oriented in a card plane, opposing primary edges of the planar surfaces, and opposing secondary edges of the planar surfaces, the opposing secondary edges being perpendicular to the oppos-
(Continued)

ing primary edges. The finite sub-laminate cards are stacked relative to one another in a successively offset manner. Also described are methods of stacking and sliding (for offset) the finite sub-laminate cards. Tapered fuselage skin and fuel tank covers are also considered.

23 Claims, 12 Drawing Sheets

(51) Int. Cl.
  *B29D 99/00* (2010.01)
  *B32B 3/10* (2006.01)
  *B32B 27/08* (2006.01)
  *B64C 1/06* (2006.01)
  *B32B 5/02* (2006.01)
  *B32B 27/12* (2006.01)

(58) Field of Classification Search
  CPC . B32B 2605/18; B32B 2603/00; B64C 1/064; B64C 1/065
  See application file for complete search history.

(56) References Cited

U.S. PATENT DOCUMENTS

| | | | |
|---|---|---|---|
| 8,540,909 B2 * | 9/2013 | Dan-Jumbo | B29C 73/10 264/258 |
| 9,296,174 B2 | 3/2016 | Tsai et al. | |
| 2005/0013961 A1 | 1/2005 | Fossey, Jr. et al. | |
| 2006/0093802 A1 | 5/2006 | Tsai et al. | |
| 2009/0102092 A1 | 4/2009 | Westerdahl et al. | |
| 2010/0028593 A1 | 2/2010 | Taketa et al. | |
| 2013/0095282 A1 | 4/2013 | Taketa et al. | |
| 2015/0030805 A1 | 1/2015 | Tsai et al. | |
| 2016/0107432 A1 * | 4/2016 | Krajca | B32B 3/08 156/60 |
| 2016/0332413 A1 | 11/2016 | Kismarton | |
| 2019/0176407 A1 * | 6/2019 | Blanc | B29C 66/4329 |
| 2021/0276300 A1 | 9/2021 | Takagi et al. | |

FOREIGN PATENT DOCUMENTS

| | | |
|---|---|---|
| JP | 2018-083362 A | 5/2018 |
| KR | 10-2006-0033015 A | 4/2006 |
| KR | 10-2009-0113820 A | 11/2009 |
| WO | WO-2018/187186 A1 | 10/2018 |
| WO | WO 2019-043248 A1 | 3/2019 |
| WO | WO-2020/252126 A1 | 12/2020 |

OTHER PUBLICATIONS

EP 21771252.0 Extended European Search Report mailed Mar. 6, 2024.

* cited by examiner

DOUBLE-DOUBLE FIELD  [±ψ]

| $A_{11}^*$ | 0 | 10 | 20 | 30 | 40 | 50 | 60 | 70 | 80 | 90 |
|---|---|---|---|---|---|---|---|---|---|---|
| 0 | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.138 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

COMPOSITE LAMINATE CARDS OF FINITE SIZE, TAPERED COMPOSITE LAMINATE STRUCTURES FORMED FROM THE SAME, AND METHODS OF MANUFACTURING AND USING THE SAME

CROSS-REFERENCE TO RELATED APPLICATIONS

This application is a National Stage Application, filed under 35 U.S.C. 371, of International Application No. PCT/US2021/022943, filed Mar. 18, 2021, which application further claims priority to and the benefit of U.S. Provisional Patent Application Ser. No. 62/991,411, filed Mar. 18, 2020; the contents of both of which as are hereby incorporated by reference in their entirety.

BACKGROUND

Technical Field

Various embodiments of the present invention relate generally to composite laminate structures, in particular various sets of cards—or sub-laminate modules or building blocks—that are stacked and slid relative to one another in an offset manner so as to facilitate low-waste and low-error producing structures. Methods of manufacturing, producing, and using such structures are also described.

Description of Related Art

To enhance acceptance, conventional composite laminate structures were generally designed to emulate the strength characteristics of conventional metal-based laminate materials and as such are constrained to designs having layers of plies that are both symmetrical and balanced. Such conventional structures, when so constrained and containing at least three ply layers (if ±45 is considered a single ply layer) or at least four ply layers (if ±45 is considered two distinct ply layers) formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [±45] and [90] plies (see e.g., legacy quad field 1, illustrated in FIGS. 1A-1B). When one each of the layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered.

In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry and a limit of three on ply groupings (i.e., there are four plies, but they're provided in three groups, namely 0°, ±45° and 90°). For instance, if a sub-laminate has 10 layers, with five of them being 0°, the 0° plies may be separated into at least two groupings, namely a set of three and a set of two plies. Three or more groups such as three 1-ply and one 2-ply could be provided but having groups of four and one—or five all in one group—is not feasible for adhering to restrictive stacking sequences required for conventional legacy quad family of laminates.

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone (from the complicated stacking sequence just described), and multiple failure modes resulting from thousands of fiber discontinuities and matrix cracking and ply delamination. Complex procedures to blend adjacent laminates with different stacking and thickness, and to drop or add plies are required for a complex structure and impede optimization and manufacturing.

Another complication of legacy quad is the number of stacking sequence permutations that run into thousands when the sub-laminates are as thick as 10 plies. Selecting the best laminate from such large pollution can become difficult if not impossible. Another equally troubling source of complication in the use of legacy quad comes from having 6- to 10-ply sub-family of building blocks (e.g., sub-laminate modules as referred to elsewhere herein). Each family can have their best laminate independent of the other families. As a result, duplications often occur and uniqueness in the selection of the best laminate oftentimes cannot be readily assured. Multiple solutions are also possible, making the choice of the best laminate subjective, resulting in inefficiencies of scale and/or inconsistencies across multiple structures.

Inefficiencies further arose in conventional composite laminate structures due to their discrete nature, exacerbated by self-inflicted constraints in the industry, including a perceived requirement that all composite laminate structures—and in particular the sub-laminate structures therein—have balanced and symmetric material characteristics; stated otherwise, they involve necessarily thick sub-laminate structures and mid-plane symmetry. Specifically, symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Although not problematic on their own, balanced laminates, like symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of particular plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result less than optimal laminate structures were used.

Prior improvements upon conventional composite laminate structures include that of double-double sub-laminate structures, which provide a continuous field of opportunities, as compared to the discrete points of conventional configurations, as may be understood by comparison of FIGS. 1A-B with FIGS. 2A-B. Notably, the continuous field of double-double sub-laminate structures achieves sub-laminates with optimally 4-ply thick structures; even thinner 2- and 1-ply thick configurations are obtainable. Throughout, the ply angles are also continuous, making blending and tapering of different laminates and their optimization achievable. Sub-laminate thickness remains constant. As a result, far fewer failure modes (and virtually no unpredictable failure modes) are encountered, and automated layup procedures may be conducted in more efficient manners than conventionally available. All of these and still other advantages lead to much simpler and lighter structures that are also better optimized for purposes of efficiency and accuracy.

Double-double sub-laminate structures also facilitate fast and less-error prone single ply drop configurations and techniques. These configurations are notably stronger and more resistant to edge and general delamination, as compared to conventional configuration. Still further, single ply drop (without need to maintain symmetry and balance) enables creation of sub-laminate structures with no interior discontinuities that cause stress concentration(s) and no stress concentrations at ply drop locations, all as may be understood with reference to FIGS. 3A-B. Single ply drops may occur on either the tool or top surfaces but need not be on both surfaces. Reference is made to the top illustration of FIG. 3A, wherein a sub-laminate structure 10 is illustrated, having a continuous top surface 11 and a tapered (ply drop-containing) tool surface 12. Compare this with the lower illustration of FIG. 3A, wherein a sub-laminate structure 20 is illustrated, having a tapered (ply drop-containing) top surface 21 and a continuous tool surface 22. Another embodiment is illustrated in FIG. 3B, wherein ply drops may be positioned along a neutral axis 32 of an otherwise symmetric sub-laminate structure 30; in this manner opposing exterior surfaces 31 may be continuous and smooth. Significant weight savings can be realized via any of these single ply drop configurations and techniques, while interior plies remain parallel with no interruptions by ply drops that can trigger multiple failure mechanisms.

Another exemplary and non-limiting application of double-double sub-laminate structures involves formation of grid, core, and/or skin structures, as may be understood generally with reference to FIG. 3. These structures have generally been formed by producing a grid/skin panel using a high-speed tape laying machine, providing an orthogonal grid formed from sets of ribs, as illustrated. In order to match the height of the ribs and their joints (where two ribs meet), though, a discontinuous insert must be added in every other layer of tape in each rib. This requires cutting of continuous tape during ongoing manufacturing operations, resulting in inefficiencies for production and/or inaccuracies in tape due to inconsistencies or the like in the cutting performed.

Thus, a need exists to provide laminate grid, core, and/or skin structures and methods of manufacturing and using the same that are able to eliminate observed inefficiencies and inaccuracies associated with utilization of continuous tapes of double-double sub-laminate structures and/or even conventional laminate structures.

BRIEF SUMMARY

Via the various embodiments described herein, composite laminate modules, layers (i.e., cards or composite laminate cards), and methods of tapering composite laminate structures and manufacturing the same using the modules and/or cards are provided. Still further, the new tapering configurations achievable via the composite laminate cards provide improved or comparable (to conventional laminates) structural characteristics and an ease of fabrication, at a reduced weight as compared to conventional laminates.

According to various embodiments a set of composite laminate cards is provided, for use in a dual-tapered composite laminate structure. The structure is defined by a plurality of finite sub-laminate cards, each one of the plurality of cards having the same shape and size as the other ones of the plurality of cards and having opposing surfaces oriented in a card plane, opposing primary edges of the planar surfaces, and opposing secondary edges of the planar surfaces, the opposing secondary edges being perpendicular to the opposing primary edges; a top surface defined by an uppermost one of the plurality of finite sub-laminate cards; and a tool surface defined by a lowermost one of the plurality of finite sub-laminate cards, the tool surface being oppositely oriented relative to the top surface; wherein: each of the plurality of cards is stacked atop adjacently positioned ones of the plurality of cards in a direction orthogonal to the opposing planar surfaces and the opposing primary and secondary edges of the plurality of cards; each of the plurality of cards is offset an offset distance in the card plane relative to an adjacently positioned one of the plurality of cards; the offset distance is defined as a distance between respective ones of the opposing primary edges of the planar surfaces of adjacently positioned ones of the plurality of cards; one of the opposing primary edges of the planar surfaces of adjacently positioned ones of the plurality of cards defines a top tapered portion of the top surface the composite laminate structure; and the other of the opposing primary edges of the planar surfaces of adjacently positioned ones of the plurality of cards defines a tool tapered portion of the tool surface of the composite laminate structure, the tool tapered portion being oppositely oriented relative to the top tapered portion.

According to various embodiments, a method of forming the dual-tapered composite laminate structure is also provided. The method involves the steps of: providing a plurality of finite sub-laminate cards, each one of the plurality of cards having the same shape and size as the other ones of the plurality of cards and having opposing surfaces oriented in a card plane, opposing primary edges of the planar surfaces, and opposing secondary edges of the planar surfaces, the opposing secondary edges being perpendicular to the opposing primary edges; establishing a tool surface by positioning of a first of the plurality of cards in a direction aligned with the longitudinal axis of the structure to be formed; stacking at least a second of the plurality of cards atop the first of the plurality of cards, the stacking occurring in an offset manner, so that at least opposing primary edges of the second card do contact the first card; stacking a last of the plurality of cards atop the at least second of the plurality of cards in the offset manner so as to define a top surface of the structure, wherein: the offset distance is defined as a distance between respective ones of the opposing primary edges of the planar surfaces of adjacently positioned ones of the plurality of cards; one of the opposing primary edges of the planar surfaces of adjacently positioned ones of the plurality of cards defines a top tapered portion of the top surface the composite laminate structure; and the other of the opposing primary edges of the planar surfaces of adjacently positioned ones of the plurality of cards defines a tool tapered portion of the tool surface of the composite laminate structure, the tool tapered portion being oppositely oriented relative to the top tapered portion.

According to various embodiments, a tapered fuselage skin is provided, comprising: a plurality of finite sub-laminate cards, each one of the plurality of cards having the same shape and size as the other ones of the plurality of cards and having opposing surfaces oriented in a card plane, opposing primary edges of the planar surfaces, and opposing secondary edges of the planar surfaces, the opposing secondary edges being perpendicular to the opposing primary edges; a continuous card layer adjacent one of the plurality of finite sub-laminate cards, the continuous card layer having a shape and size at least one of different or larger than that of each of the plurality of finite sub-laminate cards; a top surface defined by an uppermost one of the plurality of finite sub-laminate cards; and a tool surface defined by the continuous card layer, the tool surface being oppositely oriented relative to the top surface; wherein: a first of the plurality of cards is stacked atop the continuous card layer; each of the remaining ones of the plurality of cards is stacked atop adjacently positioned ones of the remaining plurality of cards in a direction orthogonal to the opposing planar surfaces and the opposing primary and secondary edges of the plurality of cards; each of the plurality of cards is offset an offset distance in the card plane relative to an adjacently positioned one of the plurality of cards; the offset distance is defined as a distance between respective ones of the opposing primary edges of the planar surfaces of adjacently positioned ones of the plurality of cards; one of the opposing primary edges of the planar surfaces of adjacently positioned ones of the plurality of cards defines a top tapered portion of the top surface the composite laminate structure; and the other of the opposing primary edges of the planar surfaces of adjacently positioned ones of the plurality of cards defines a tool tapered portion of the tool surface of the composite laminate structure, the tool tapered portion being oppositely oriented relative to the top tapered portion.

According to various embodiments, a tapered aircraft wing is also provided, comprising: a plurality of non-rectangular finite sub-laminate cards, each one of the plurality of cards having the same shape and size as the other ones of the plurality of cards and having opposing surfaces oriented in a card plane, opposing primary edges of the planar surfaces, and opposing secondary edges of the planar surfaces, the opposing secondary edges being perpendicular to the opposing primary edges; a top surface defined by an uppermost one of the plurality of finite sub-laminate cards; and a tool surface defined by a lowermost one of the plurality of finite sub-laminate cards, the tool surface being oppositely oriented relative to the top surface; wherein: each of the plurality of cards is stacked atop adjacently positioned ones of the plurality of cards in a direction orthogonal to the opposing planar surfaces and the opposing primary and secondary edges of the plurality of cards; each of the plurality of cards is offset an offset distance in the card plane relative to an adjacently positioned one of the plurality of cards; the offset distance is defined as a distance between respective ones of the opposing primary edges of the planar surfaces of adjacently positioned ones of the plurality of cards; one of the opposing primary edges of the planar surfaces of adjacently positioned ones of the plurality of cards defines a top tapered portion of the top surface the composite laminate structure; and the other of the opposing primary edges of the planar surfaces of adjacently positioned ones of the plurality of cards defines a tool tapered portion of the tool surface of the composite laminate structure, the tool tapered portion being oppositely oriented relative to the top tapered portion.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Figures 1A, 1B:
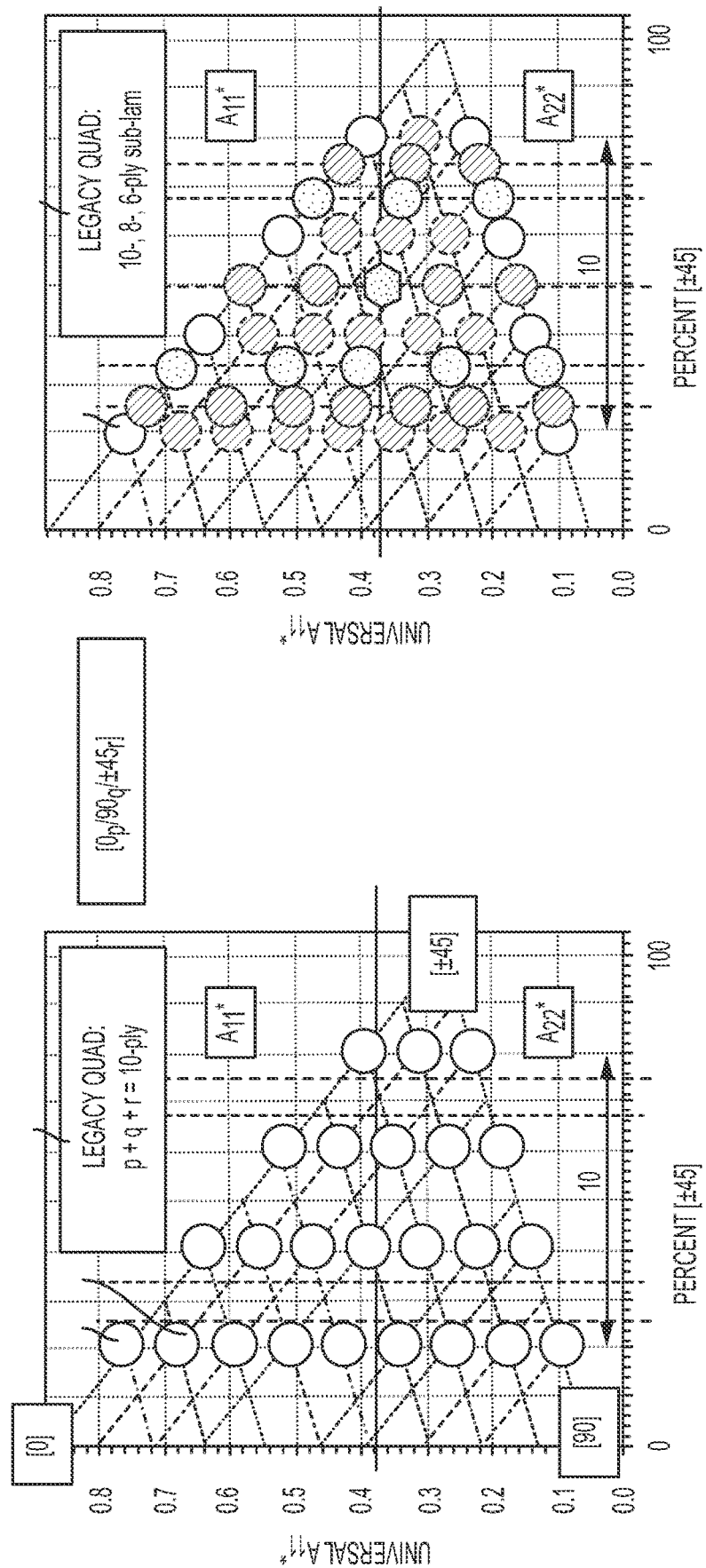
FIGS. 1A-1B shows a legacy quad conventional sub-laminate family, with focus upon a 10-ply configuration.
Figures 2A, 2B:
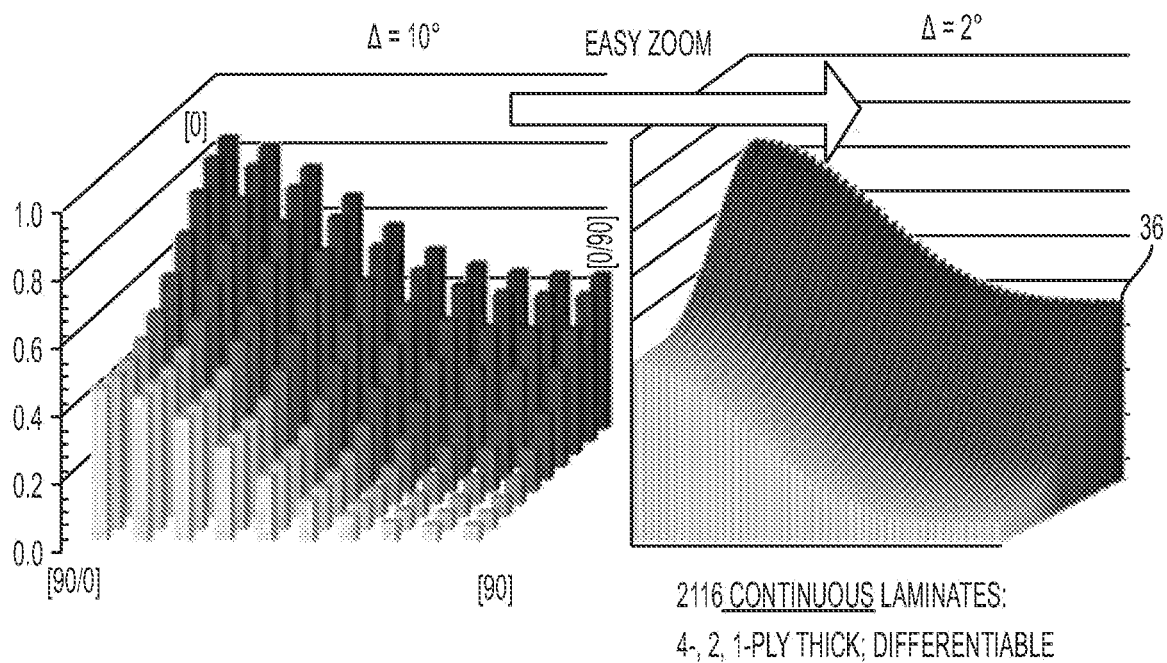
FIG. 2A shows one master-ply stiffness component of all of the sub-laminates within the double-double sub-laminate family.
FIG. 2B shows two three-dimensional representations of the double-double sub-laminate family at angle increments of 10 and 2 degrees, respectively.
Figure 3A:
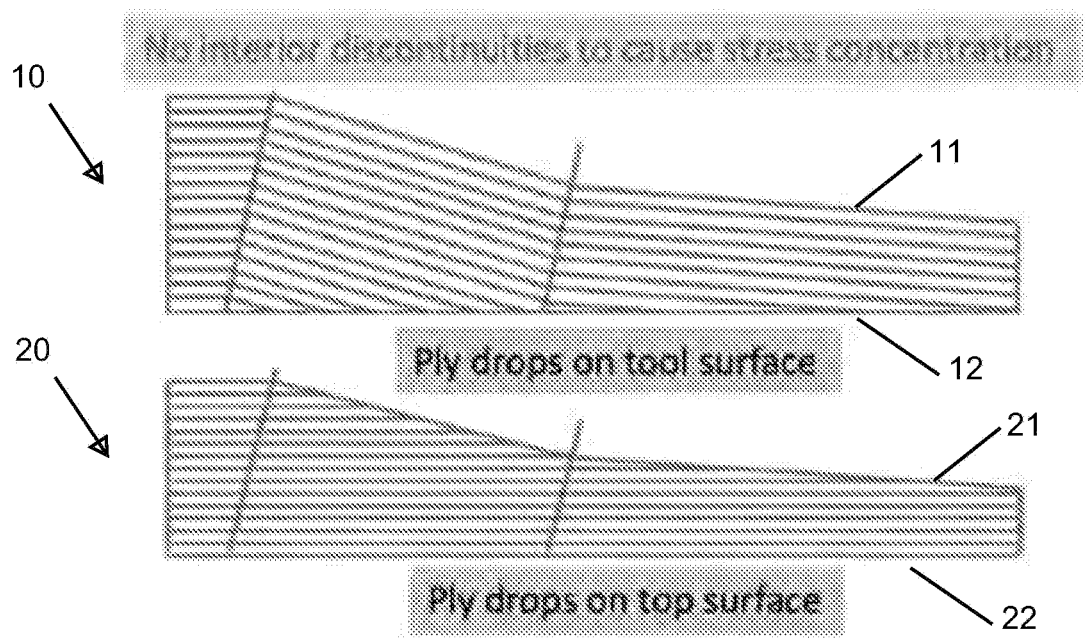
FIGS. 3A-B show single ply drop configurations facilitated by an exemplary double-double sub-laminate family.
Figure 3B:
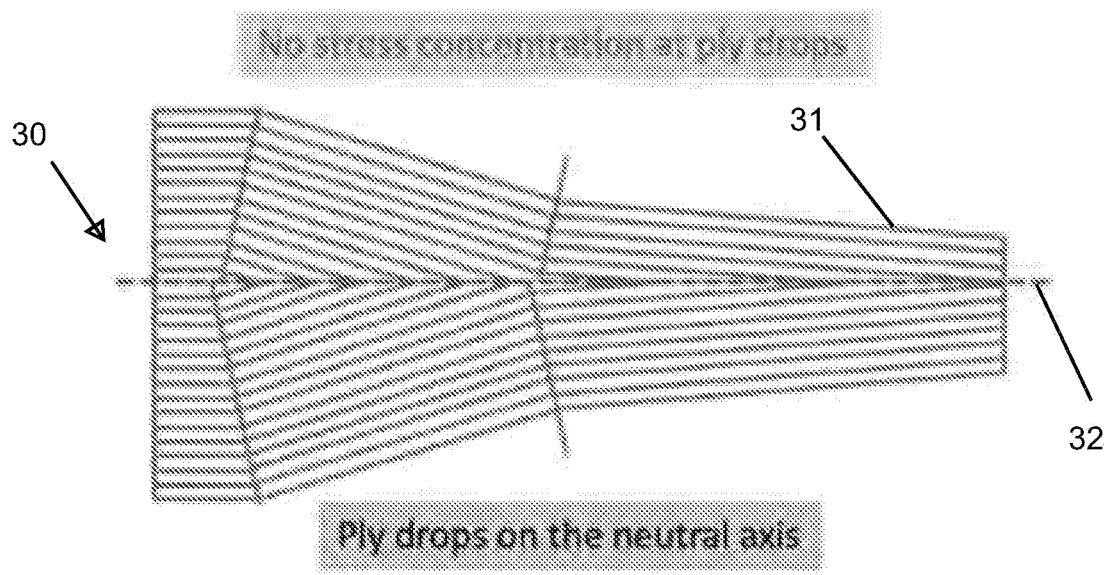

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity but include the general class of which a specific example may be used for illustration. The terminology herein is used to describe specific embodiments of the invention, but their usage does not delimit the invention, except as outlined in the claims.

As an initial matter, it is noted that various laminate structure (e.g., ply layers and/or sub-laminate modules) consolidation options exist, as are commonly known and understood in the art. Fabrics within the ply layers and/or the sub-laminate modules may be furnished as dry fibers or pre-impregnated with resin (e.g., prepreg). Non-limiting examples of each, as also commonly known and understood in the art, include the non-limiting examples of Resin Transfer Molding, Vacuum Resin Transfer Molding, Heated Vacuum Assist Resin Transfer Molding, out of Autoclave Processes, and Resin Film Infusion. In certain embodiments, the plies may be carbon fiber plies defined by or formed from a plurality of fibers. Still other embodiments may be alternatively configured with various materials (e.g., fiberglass or an electric conductor such as copper wire). As a non-limiting example, in the context of wind turbine blades, the laminate structures and/or sub-modules described herein may, instead of carbon fiber plies, incorporate fiberglass plies, as may be desirable for cost or other considerations, as the case may be. In still other embodiments, hybridization may be desirable, leading to a mixture of any of variety of combinations of carbon fiber, fiberglass, and/or periodically spaced electric conductor (e.g., copper wire, as lightning protection), or still other materials as ply layers.

As also alluded to elsewhere herein, one exemplary, non-limiting, and useful application of double-double sub-laminates lies in the construction of composite grids and/or composite grid and skin and/or grid/core/skin structures. Notably, with the material characteristics of—in particular homogenized—double-double sub-laminate structures, implementation of grid and skin and/or grid/core/skin-type structures is predictable and achievable; it is also made more efficient alongside optimizable and automated layup procedures that in a straightforward manner are able to create total laminates that are not only strong and light-weight, but also damage tolerant and inexpensive.

Conventional composite grid structures—typically multi-directional in nature—are generally designed to emulate the strength characteristics of conventional metal-based structural materials, and as such have been typically constrained to designs utilizing more than two ply layers or components. One such example, the Wellington fuselage (detailed further in WO 2018/187186) utilizes a grid that was made of aluminum and had a [±45] grid with a nominal [0] tie. One of the most important features of composite grids is the inherent damage tolerance. As one rib or joint is removed by external force or impact, the lattice structure with high density of intersection ribs will form a new network with little loss in the integrity of the entire grid structure. The survival of the Wellington bomber fuselage after battle damage is also a true testimony of this inherent damage tolerance. Notably, traditional laminates (skins without grids) are penalized by at least a factor of 2 for damage tolerance to guard against growth of micro cracking and delamination. Having grids as the backbone of a grid/skin construction is thus a game changing concept that permits fuller use of the intrinsic properties of composite materials.

Recent advances in technology have also identified composite grids as providing an exceptionally light weight configuration and/or alternative to configurations such as those utilized in the Wellington fuselage. For example, unidirectional ribs can replace aluminum tri-ax grids. Still further, any of a variety of angles—both for the grid and the tie (or skin layer)—may be utilized where double-double sub-laminate structures (detailed further in WO 2020/252126) are relied upon. By way of example, in WO 2020/252126 two embodiments are illustrated, namely a single skin grid structure and a double skin grid structure. One double helix or sub-laminate [±A] may be used to form a skin layer, while another double helix or sub-laminate [±B] may be used to form the grid components. In this manner a single double-double sub-laminate [±A/±B] may be utilized for any skin/grid combinations. In certain embodiments, cross-laying of the sub-laminate [±B] achieves the multi-directional (i.e., diamond-like) pattern of the grid and the density thereof may vary according to various embodiments. Grid structures may also incorporate discontinuities or structures of fixed lengths (i.e., continuous tape versus discontinuous or finite length tape), as also detailed in WO 2020/252126.

The strength of composite grid structures and/or any of a variety of structures defined with double-double sub-laminate materials also surpass that of aluminum grid by even a wider margin than stiffness, as also detailed in WO 2020/252126. Thus, the well-known resistance to explosion of the Wellington bomber may be enhanced via utilization of the double-double sub-laminate materials, with greater anticipated effectiveness for—as a non-limiting example—fuselages of airplanes.

As mentioned previously herein, composite laminate structures can be lighter, stronger, and lower cost if tapering is applied to remove laminate thickness in areas not subjected to heavy loads. In certain conventional techniques, when plies are dropped, the size and position of each ply is difficult to determine and implement, for example when using conventional automated layup machines. The various embodiments described herein, though, utilize double-double laminates, whereby through a sliding of plies (or finite sized laminate cards) like playing cards in a deck, the desired double-double laminate taper can be created. Each card according to certain embodiments has the same dimensions and size, which in part facilitates the ease with which tapering can occur via the card sliding process. Tapering may thus be controlled by the degree of sliding of each card, which in turn can provide easily laid up tapered structures with minimal scrap, and lighter weight, thinner, and stronger edges less prone to delamination.

Exemplary and non-limiting advantages achieved via the finite laminate cards described herein thus include: (1) a simplistic and straightforward way to save weight and reduce errors; (2) a reduction in free edge delamination at tapered edges; (3) constant offset with same travel or displacement distance achieving a simple layup process; (4) reduction in errors and scrap with same size starting ply or sub-laminate structures; (5) continuous stacking without regard to mid-plane symmetry, even when tapering; (6) accessibility improvement for exterior ply drops, permitting easy inspect to confirm correct lamination; also no internal discontinuities created by tapering or visible from the outside; (7) an extra layer of finishing fabric to protect ply drops; (8) ease of repair for any errors in layup, simply by adding desired patches of same starting double-double on the outside; and (9) ability to use pre-stacked thermoplastic materials.

Figure 4:
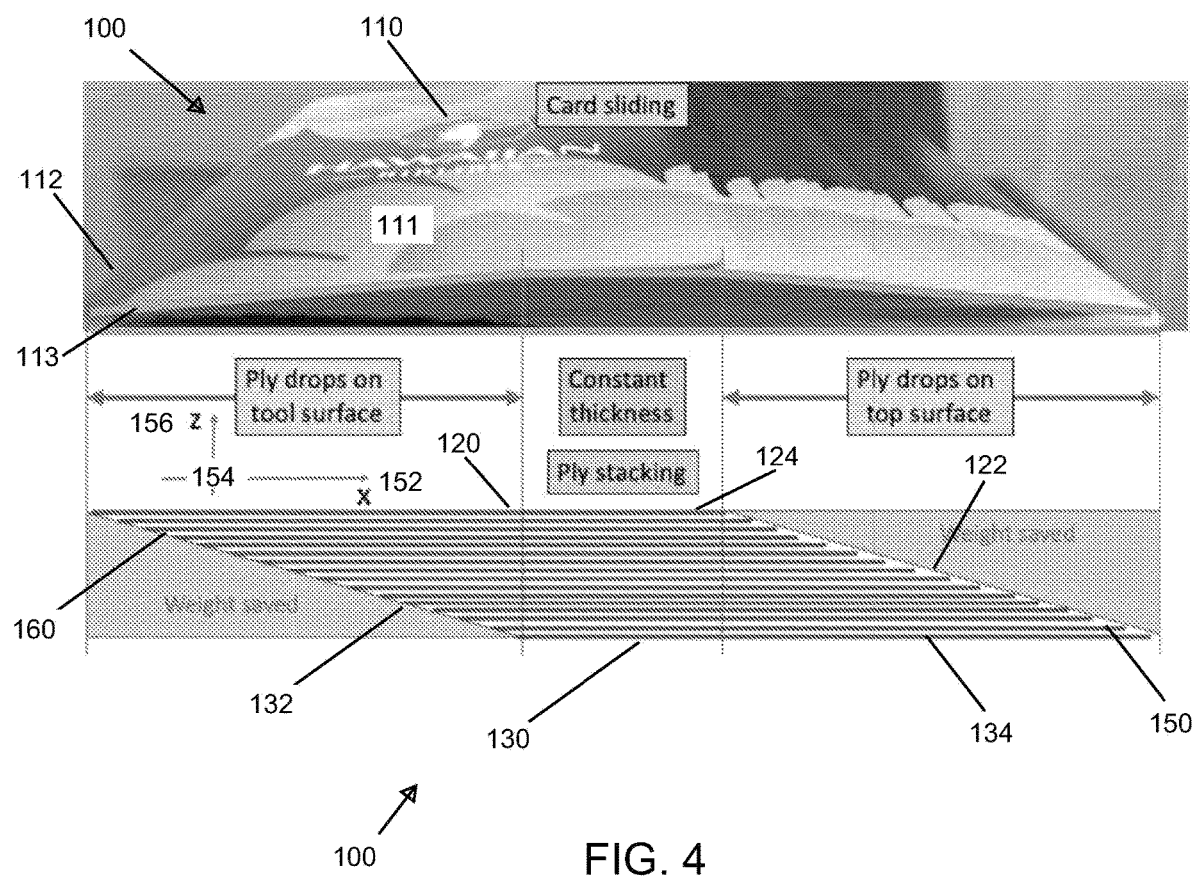
FIG. 4 shows a set of composite laminate cards stacked and slid so as to form a composite laminate structure according to various embodiments.

Turning to FIG. 4, a set of finite laminate cards 110 are illustrated having been stacked in an offset manner relative to one another to define a composite laminate structure 100 according to various embodiments. Each card 110 may itself be a single double-double sub-laminate module or building block (e.g., four-plies in thickness) (see WO 2020/252126). Thickness may be as thin as 0.24 mm utilizing thin-ply constructions previously described. Notably, though, each card 110 is consistently sized and profiled. To ensure a linear profile, each card 110 has a planar surface 111 (an opposing planar surface is also provided, not shown) with a pair of opposing primary edges 112 and a pair of opposing secondary edges 113. In certain embodiments, each card 110 may be substantially square-shaped, resulting in the edges 112, 113 being of substantially the same length. In other embodiments, each card 110 may be substantially rectangularly-shaped, resulting in the primary edges 112 being larger in length than the secondary edges 113.

In certain exemplary embodiments, each card 110 may be made from the same material, in addition to being the same shape and size. In other embodiments, though, differing layers of the cards (i.e., each card or a subset, alternating or otherwise) may be made of different materials. Still further, within each card 110, where formed from sub-laminate modules that might involve a set of plies (as described elsewhere herein), it should be understood that the sub-laminate modules forming each card 110 need not be the same across multiple cards and/or even within a single set of cards. Thicknesses, materials, and sub-components may all vary across sets of cards; the only requirement is to have the same shape and size in each set of cards.

In certain exemplary embodiments, each card 110 may have primary edge 112 dimensions of any of four (4), six (6), or twelve (12) inches. In these and other embodiments, each card 110 may have secondary edge 113 dimensions of any of four (4), six (6), or twelve (12) inches. Combinations may thus be envisioned that are square or rectangular shaped, such as 4×4 cards, 6×6 cards, 12×12 cards, 4×6 cards, 6×12 cards, or the like. It should be understood that the primary and secondary edges 112, 113 may be smaller or larger than four or twelve inches; they may also be any size within that range, thus facilitating provision, as a no-limiting example, of cards 110 having a size of 6×8 inches or 6×9 inches, or otherwise. Of note, according to various embodiments, where a composite laminate structure 100 is formed from a set of cards 110, the latter are generally all shaped and sized identical relative to one another, within the composite laminate structure. In some embodiments, though, as will be described elsewhere herein, differently shaped and/or sized cards 110 may be mixed within a single composite laminate structure 100 to provide two-dimensional tapering. It is known, though, that as compared to one-dimensional tapering, when sliding occurs in both x- and y-axis directions, corners of any resulting (i.e., via card stacking) composite laminate structure may be jagged. As a result, some cutting and/or shaping may be required; that said, various advantages remain surrounding the ease of stacking and tapering, not to mention the weight savings, also described elsewhere herein—even despite the need occasionally for cutting/trimming at corners.

Remaining with FIG. 4, it should be understood that a composite laminate structure 100 formed from a set of cards 110 will itself have several defining characteristics, including a top surface 120 (which will be planar with cards having planar surfaces 111 are utilized) and an opposing tool surface 130. Due to the card sliding techniques described elsewhere herein, the composite laminate structure 100 has various portions, defining opposing tapers, namely a tapered portion 122 of the top surface 120, a tapered portion 132 of the tool surface 130, and a constant thickness portion 140 (see FIG. 5). Opposing first and second edges 142, 144 of the constant thickness portion 140, as also evident from FIG. 5, may define starting points of the tapered portions 122, 132, defined also by the primary edges 112 of a topmost or bottommost card, respectively.

The top surface 120 according to various embodiments may comprise not only the tapered portion 122 but also a planar portion 124. The tool surface 130 according to various embodiments may likewise comprise not only the tapered portion 132 but also a planar portion 134. As mentioned, primary edges 112 of respective cards 110 within the composite laminate structure define the respective tapered portions 122, 132. Due to the finite and equal size of each of the cards, sliding techniques employed result in distinct offset top surfaces 150 and offset tool surfaces 160, respectively. The size of each of these surfaces 150, 160 may vary, dependent upon the degree of slide provided between respective cards 110. Offsets may thus be constant, variable, continuous, and/or discontinuous across various composite laminate structures, however desirable (for example, if symmetry lengthwise is not needed).

In certain embodiments, dimensions of the offset surfaces 150, 160 and thus the degree of sliding between adjacently positioned cards 110 of the set of cards in a composite laminate structure may range from 1/8 to 1.0 inches. Other embodiments may have offset surface dimensions in a range from 1/4 to 3/4 inches. Certain embodiments may range from 1/4 to 1/2 inches. Still other embodiments may have offsets surface dimensions ranging from 0.01 to 4.0 inches; 0.05 to 1.0 inches; 1/8 to 1.0 inches; and/or 1/16 to 4.0 inches. Continuous and constant offset surfaces for certain composite laminate structures 100 avoid jagged edges and/or minimize delamination risks. Variable and/or discontinuous offset surfaces, though, may enable creation of complex tapering surfaces for other composite laminate structures 100, although the risk of error becomes heightened.

Figure 6:
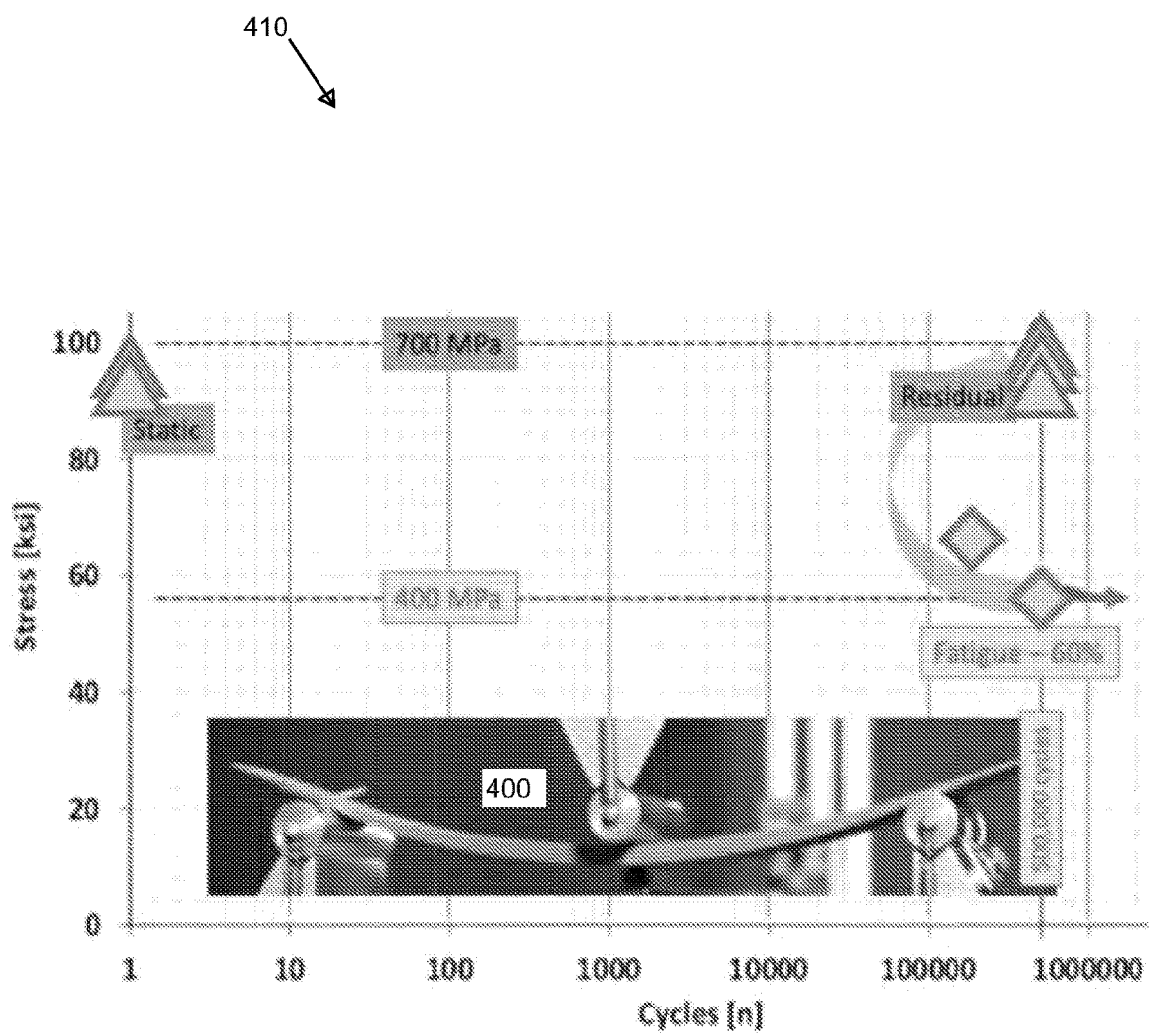
FIG. 6 shows resulting data from fatigue testing of the dual-tapered beam of FIG. 5 according to various embodiments.
Figure 8:
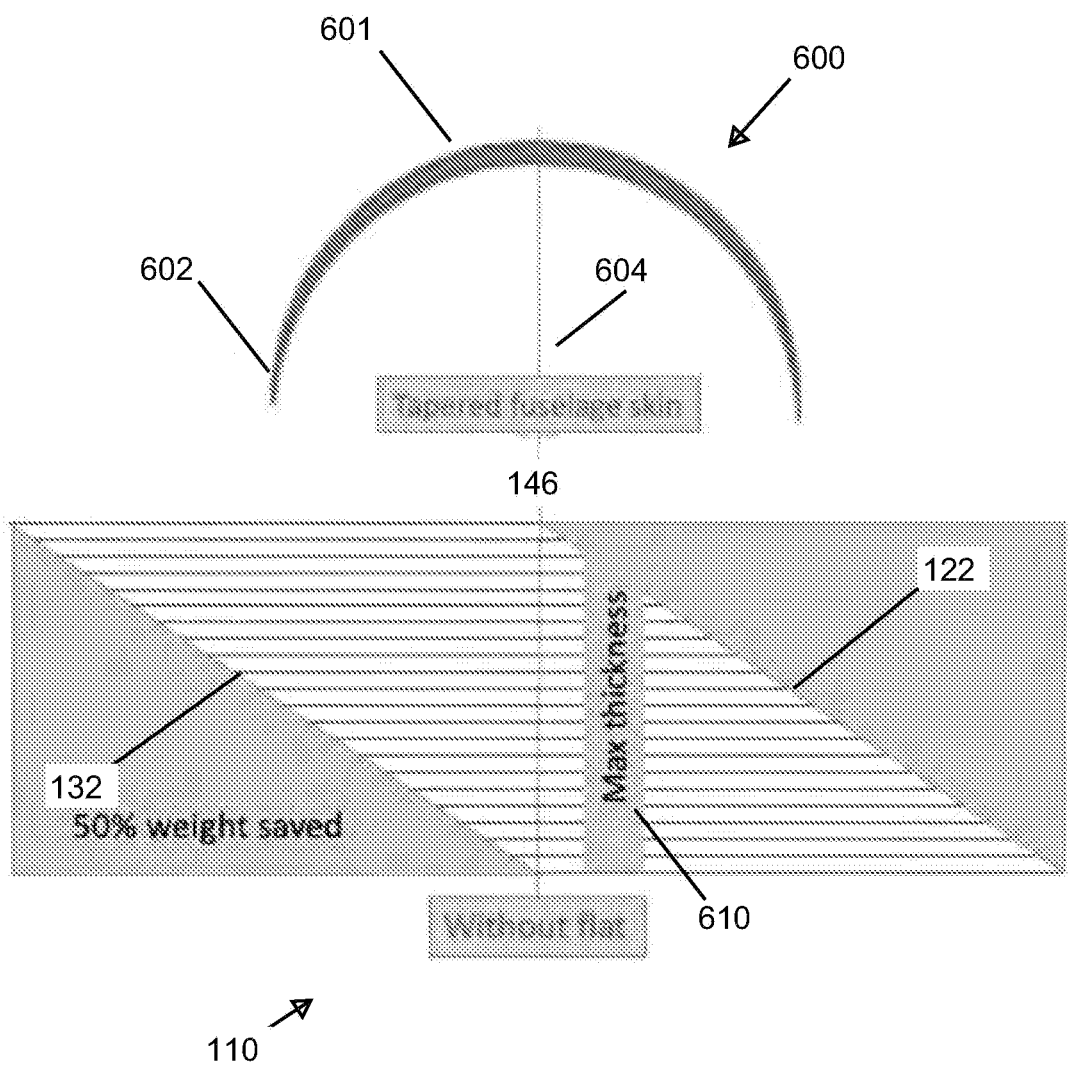
FIG. 8 shows an exemplary tapered fuselage skin application utilizing the set of composite laminate cards of FIG. 4 stacked and slid according to various embodiments.

According to various embodiments, as may be understood by way of comparison of FIGS. 4 and 8 (to be detailed elsewhere herein), the degree of offset and thus the dimension of the offset surfaces 150, 160 may determine whether an area or a point is defined as the constant thickness portion 140. For example, as illustrated in FIG. 8, there may be no constantly thick area, meaning there is no "flat" portion of equal thickness other than at a single point or axis 146. By way of contrast, as illustrated in FIG. 4 (and FIG. 6, also detailed elsewhere herein), an area between edges 142, 144 defines an area defining the constant thickness portion 140. In certain applications (e.g., a tapered stringer or an automobile leaf spring) a central area of equal or constant thickness for a composite laminate structure 100 may be desirable, followed by opposing tapered portions 122, 132. In other applications (e.g., a tapered fuselage skin as in FIG. 8), continuous and opposing tapered portions 122, 132 may be desirable, without provision of any constant thickness portion 140 with a measurable area thereof.

While degree of sliding and thus offset surface 150, 160 sizing may influence whether a flat or constant thickness portion 140 having a measurable area is provided for specific composite laminate structures 100, the number of card layers provided can also be influential. For example, as illustrated in FIG. 8, twenty-two (22) layers of cards 110 are provided, whereby the tapered portions 122, 132 each comprise 50% of a total length of the composite laminate structure 100 defined by the stacked and slid cards 110. By way of contrast, fewer layers of cards are stacked in FIG. 7 (twelve) and in FIG. 4 (sixteen). In this manner, at least distinct and different variables may be manipulated via various card stacking and card sliding techniques, so as to provide different (e.g., flat versus no flat) profiles for composite laminate structures 100, as may be desired. It should be understood that any number of ply/card layers may be provided, as appropriate for desired applications (e.g., aircraft wings) of the formed composite laminate structures; layers may thus range in the hundreds (e.g., 120 plies) or higher.

Returning to FIG. 4, it may be understood that as illustrated a one-dimensional offset is provided for the set of cards 110 stacked and slid to define the illustrated composite laminate structure 100. Specifically, as illustrated, the one-dimensional offset is provided in offset direction 152, aligned with the x-axis direction annotated on FIG. 4. In conjunction with the x-axis directional sliding, stacking of the set of cards 110 occurs in the z-axis direction, also referred to herein as the stacking direction 156. Orthogonal to both the one-dimensional offset direction 152 and the stacking direction 156 is a possible two- or second-dimensional offset direction 154, aligned in the y-axis direction (i.e., out of the page). Two or multi-dimensional or multi-directional sliding of the cards 110 may facilitate complex composite laminate structure 100 formation, whereby the degree of offsets may be the same or vary in the distinct directions 152, 154.

It should be understood that, although, a double-sided tapering is illustrated in FIG. 4, provision of additional cards 110 in either of the "weight saved" zones could further lengthen (in the x-axis direction) the length of the composite laminate structure 100 formed, so as to provide a single-sided taper, if so desired. It is envisioned further that if a set of non-finite length cards (not shown) were injected along the length, opposing end and same side tapering of a composite laminate structure 100 could also be provided with opposing left- and right-sided sliding techniques, as described elsewhere herein.

As mentioned previously, the degree of offset and thus the dimensions of offset surfaces 150, 160 may vary. Still further, the degree of offset may vary not only across different embodiments, but also within individual embodiments. This may occur in one- or two-dimensional manners. Variation of offset degree may influence flexibility (versus stiffness) of a defined structure. For example, larger offsets may facilitate creation of composite laminate structures have greater flexibility (and thus less rigidity or stiffness) than structures formed with smaller offsets.

As previously mentioned, tapering can be a major operation in the layup process, even with all the various advantages realized via use of double-double laminate structures (versus still further prior quad-laminate structures). As an example, if a 12-ply (12-card using present terminology) laminate is to be tapered from having twelve layers in the center of a beam or panel to four layers along the edges, at least plies of eight different sizes would have conventionally been required, cut and stacked appropriately relative to one another. More than eight permutations could be required dependent on length and thickness dimensions, creating a labor intensive, scrap creating, and time-consuming process prone to error. In the techniques achievable via sliding of the cards 110 described herein (see FIG. 4), the same size building block is used through, achieving a taper by sliding cards (or plies or layers) with equal increments or shifts relative to one another. Each card 110 may itself be a single double-double sub-laminate module or building block (e.g., four-ply or 0.24 mm thick, thin ply). Notably, though, via the sliding techniques described herein, all plies and/or cards are visible for verification, scrap is minimal, and stacking operation is much less tedious and much less prone to error.

Figure 5:
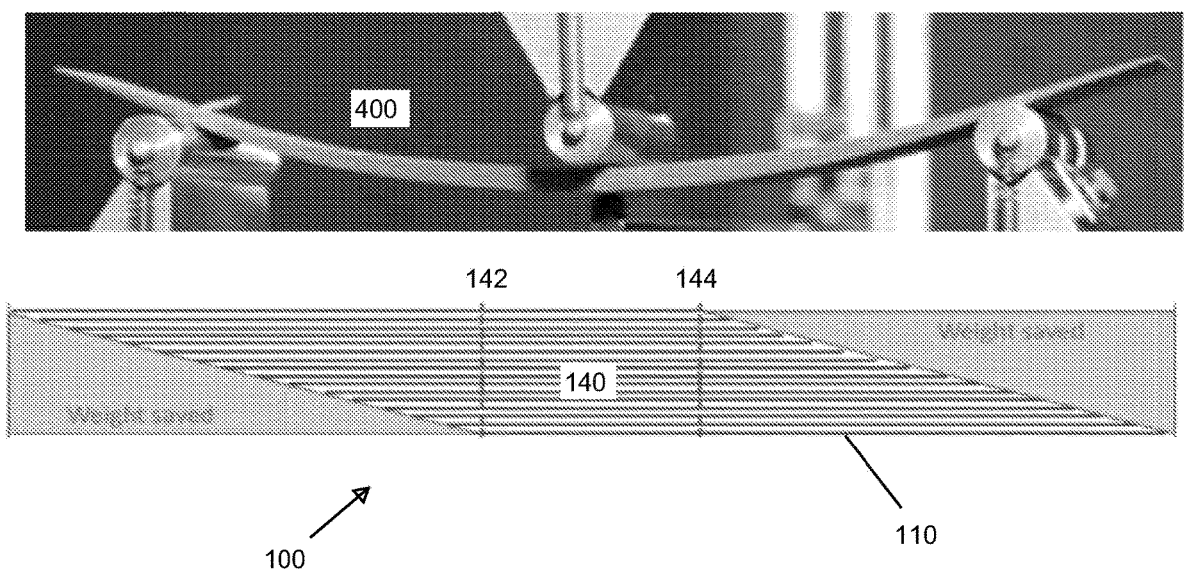
FIG. 5 shows the set of composite laminate cards stacked and slid for purposes of forming a dual-tapered beam according to various embodiments.

A finished dual-tapered beam 400, illustrated as an exemplary application of a composite laminate structure 100, may be seen in FIG. 5. As stacked and slid, the provided cards 110 result in a flat or constant thickness portion 140 in the center of the dual-tapered beam, with tapering beginning at edges 142, 144 of the constant thickness portion. Fatigue test data 410 for the finished dual-tapered beam 400 may be seen in FIG. 6, wherein ply (or card) drops on the exterior surfaces (i.e., the tapered portions 122, 132 of the top and tool surfaces 120, 130, respectively) did not peel off or suffer measurable delamination. Fatigue after 500,000 cycles, as measured, is also illustrated. In the production of the dual-tapered beam of FIG. 5, the ease and accuracy of the card stacking/sliding technique and the configurations described herein was realized. Stated otherwise, having ply drops on the tool side in one part of the beam, and on the bag side in the other part was realized via card sliding alone. Thus, having each card engineered to have the best double-double angles, beams with optimal profiles 1000 (see also FIG. 12) can realize minimal weight with linearized tapers.

Figure 12:
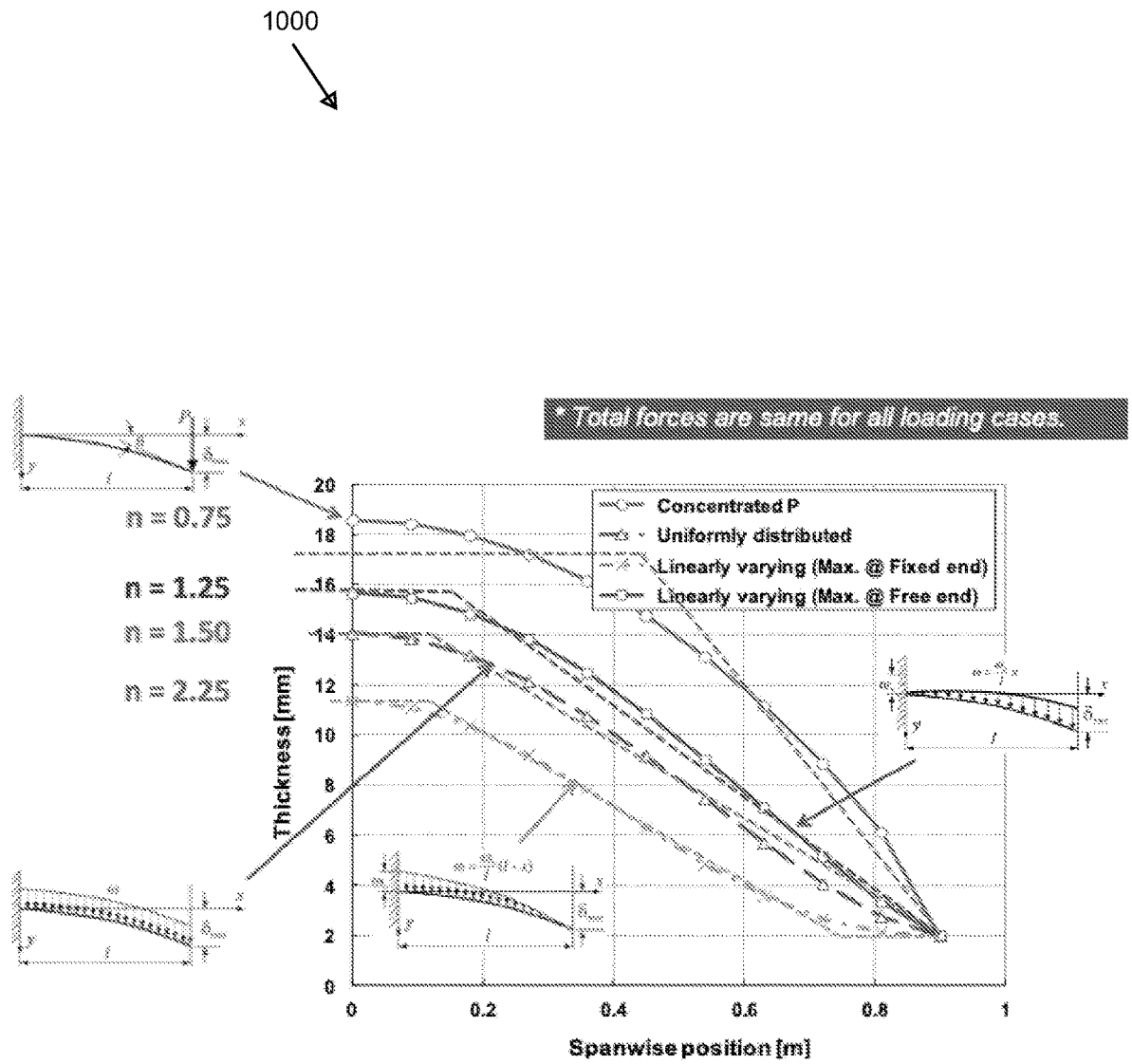
FIG. 12 shows data indicative of bi- and tri-linear approximations of application of card sliding techniques according to various embodiments.

Referencing momentarily FIG. 12, it may be understood that the various illustrated profiles 1000 correspond to bi- and tri-linear approximation of application of card stacking/sliding techniques and the configurations described herein. Notably, the lower three profiles have substantially the same slope, meaning that any superposition thereof can expect similar characteristics and performance. For example, by superposition of three loads (e.g., constant, linearly increasing, and linearly decreasing), many different loading situations—as may be expected for various applications using composite laminate structures—may be created. But all will have substantially the same slope, formed via the configurations described herein, which means that almost any load can be approximated by the same linear portion. This superposition follows the common phase-diagram rule. Flat portions (as detailed elsewhere herein) may be different, but minimal relative to the linear portion.

Figure 7:
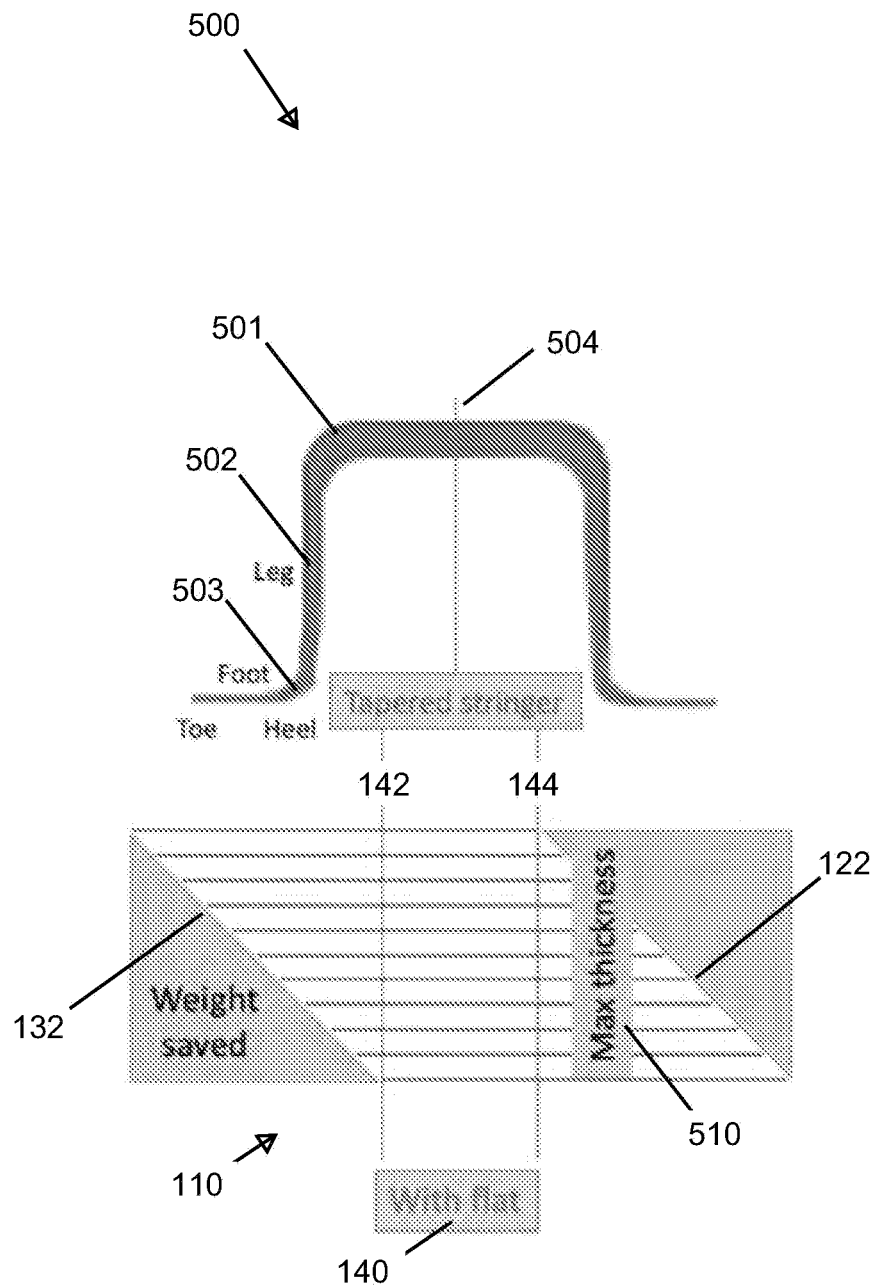
FIG. 7 shows an exemplary tapered stringer application utilizing the set of composite laminate cards of FIG. 4 stacked and slid according to various embodiments.

Turning to FIG. 7, illustrated therein is another left-side card sliding technique-created composite laminate structure, namely a tapered stiffener 500 formed from a set of cards 110. As referenced elsewhere herein, a left-side card sliding technique provides a top surface tapered portion 122 on the right side (of the page), as compared to the opposite, for a right-side card sliding technique. As mentioned previously herein, two- or multi-directional sliding may also be utilized to define or form complex composite laminate structures 100, but for purposes of FIG. 7, a one-dimensional card sliding is illustrated.

Remaining with FIG. 7, the flat or constant thickness portion 140 provided therein (see also edges 142, 144 of the constant thickness portion) may according to various embodiments align with and thus define hip or base portions 501 of the tapered stringer. Opposing portions 501, 502, 503 may be, accounting for the flat or constant thickness portion 140, mirrored around a central axis 504 of the tapered stiffener. Portions tapering off from the hip or base portions 501 of the stiffener 500 may include, as examples, leg portions 502 and foot (including heel and toe) portions 503. Additional or alternative portions may also be provided in other embodiments, with a consistent and constant (in at least the illustrated embodiment) taper from thicker central to thinner distal or end portions.

From FIG. 7 it may also be understood that composite laminate structure 100 embodiments (including that of the illustrated tapered stiffener 500) may have respective top and tool surfaces (with tapered portions 122, 132, respectively) on opposing sides of a flat or constant thickness portion 140. As illustrated, the degree of offset results in a structure wherein the flat or constant thickness portion 140 accounts for approximately ⅓ of a length of the stiffener in the x-axis direction (see FIG. 4). Stated otherwise, approximately ⅔ of the length of the stiffener in the x-axis direction may be tapered surfaces. FIG. 4 provides an alternative illustration, wherein the degree of offset (i.e., sliding) is greater than that in FIG. 7, such that the flat or constant thickness portion 140 (see also FIG. 5) may account for only approximately ¼ of a length of the resulting composite laminate structure 100. In these and other embodiments, ¾ of the length (in the x-axis direction) may be composed of tapered portions 122, 132 or tapered surfaces defined by those portions. Steeper or shallower tapered surfaces may thus be achieved via the card sliding techniques and configurations described herein. Of course, embodiments having tapered portions on more or less than ⅔ or ¾ of the length (in the x-axis direction) may also be provided, with larger or lesser (even non-existent—see FIG. 8) flat or constant thickness portion 140 areas.

Referencing now FIG. 8 in this regard and otherwise, illustrated therein is a tapered fuselage skin 600 as another exemplary application of a composite laminate structure formed from a set of stacked and slid cards 110. By way of comparison with FIG. 7, the tapered fuselage skin 600 does not include a flat of constant thickness portion; instead, according to various embodiments continuous—yet opposing surface (top versus tool)—tapering is present. Thicker central portions 601 are provided adjacent to and reflective around a central axis 604 (aligned with the central axis 146 of the skin itself), extending outwardly and tapering more thinly to distal end portions 602. Additional or alternative portions may also be provided in other embodiments, for example if differing degrees of tapering were desired on opposing sizes of axis 146.

Comparison of FIGS. 7 and 8 also illustrates that, according to various embodiments of composite laminate structures described herein (e.g., tapered stiffeners, tapered fuselage skins, automobile leaf springs, beams (truck trailers/vehicle chassis), ribs, and the like), the thickness of the structures 100 may also vary, dependent upon the number of cards stacked in the y-axis direction (see also FIG. 4). The number of cards stacked may range from eight to twelve or even sixteen to twenty-two or twenty-four, or more (e.g., 120 or more). In certain embodiments, a determining factor in thickness is homogenization of the composite laminate structure, whereby material characteristics are continuous and uniform throughout.

As a comparative example, with reference to FIG. 7, overall dimensions (non-limiting in nature) may be six inches square in the height and width of the stiffener, with three inches for each foot. The total width would thus be twenty-four inches (3+6+6+6+3). The constant width of the card would be fifteen inches (3+6+6). If, again as a non-limiting example, the maximum number of plies is eighteen (18) in the base portions 501, each offset distance (and surface defined thereby; see 150, FIG. 4, by analogy) would be 9/18 or ½ an inch. The 9, notably is based upon the distance between the left foot (toe) portion 503 and central axis 504. Beginning at the left toe of the foot portion 503, one ply would cover from the toe to position 144. At the left heel, the composite laminate structure would be tapered (upward from the toe) to a thickness of six plies. Running up the left leg portion 502, ply thickness would increase from six to eighteen plies, adjacent the transition to the base portions 501. The last ply there would extend to the right toe of the right foot portion 503, being then also one ply thick, as at the left toe.

Figure 13:
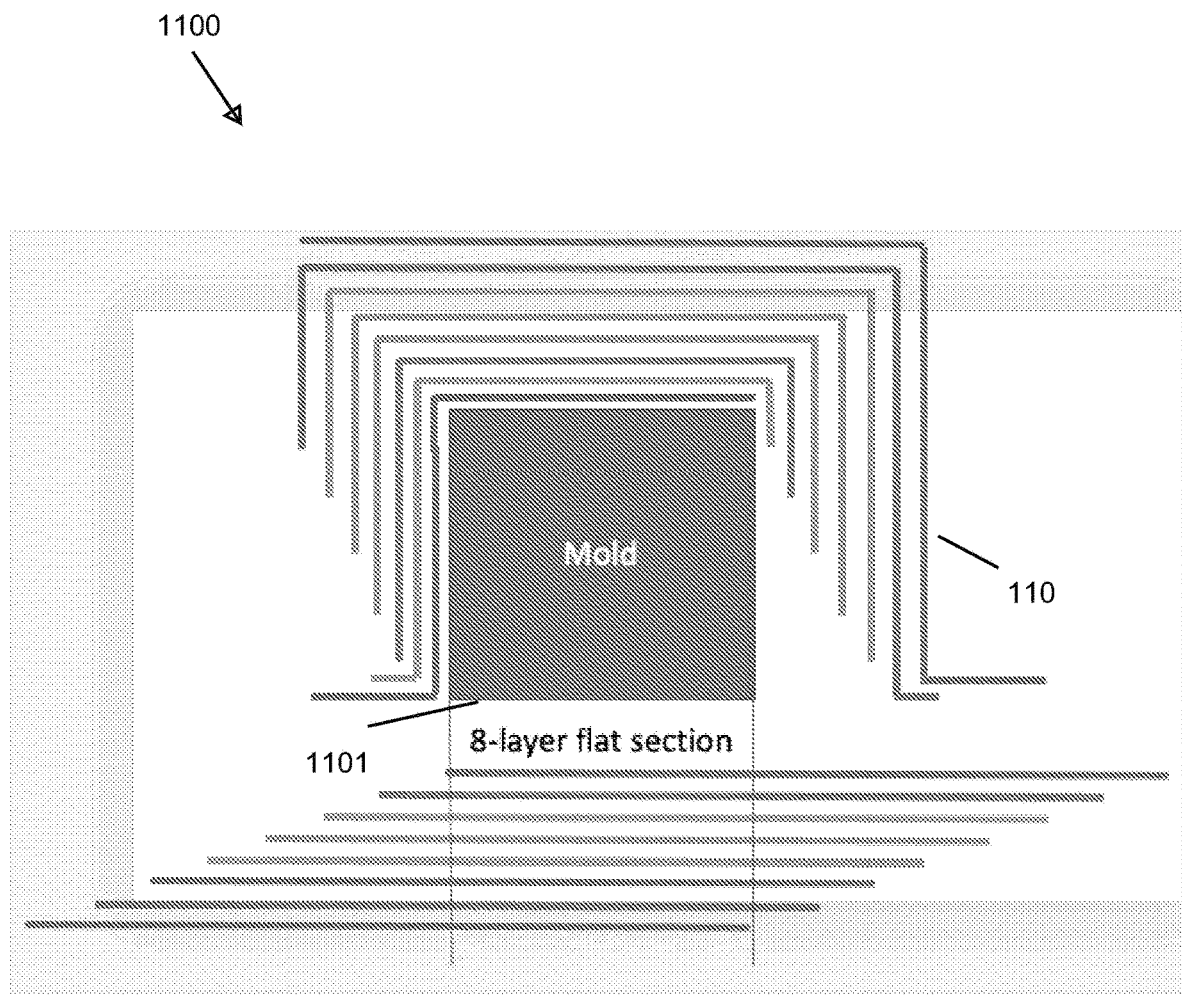
FIG. 13 shows a further exemplary mold-adhering structure formed from stacked and slid composite laminate cares, utilizing an eight-ply assembly according to various embodiments.

Referencing briefly FIG. 13, the distinct offsets of each layer described above relative to FIG. 7 may be seen. Much like in the embodiment of FIG. 9 (described elsewhere herein), it may be understood from FIG. 13 that an eight-ply assembly 1100 may be achieved, illustrated in cross-sectional view. The eight-ply assembly 1100 generally represents a composite laminate structure (comparable to that of structure 100 described elsewhere herein, comprised of a plurality of cards 110), but for application as a tapered stringer. As should also be understood from FIG. 13, in addition to sliding of the discrete cards (illustrated in iterative and differing colors or patterns), manipulation (e.g., bending) of the card layers may also occur, so as to conform the formed laminate structure to a shape of a mold 1101, whether that shape be flat, tubular or tank-like. Of note, in FIG. 13, the lowermost illustration is to scale, while the uppermost is not. Also of note, the molds shown in FIGS. 9, 10, and 13 are "male" molds, as such are commonly known and understood to involve, by those of ordinary skill in the industry; additional or alternative molds, including "female" molds may also be provided.

An exemplary advantage achieved via this example, described with reference once more to FIG. 7, is that the total dimensions of the tapered stringer is fifteen inches, as compared with the full length of twenty-four inches, with constant thickness of only $15/24$, stated otherwise 62.5%. Thus, while flexural rigidity is provided, a significant reduction in weight to 62.5% of that otherwise achievable (i.e., outside the card sliding configurations and techniques described herein) is realized. Additional advantages and benefits include ease of layup and sliding, speed of layup and sliding, and reduction of errors in layup and sliding, throughout fabrication of composite laminate structures such as the tapered stringer illustrated. Similar advantages are, of course, realized in additional applications of composite laminate structures, as may be understood with reference to FIGS. 9-11.

Figure 9:
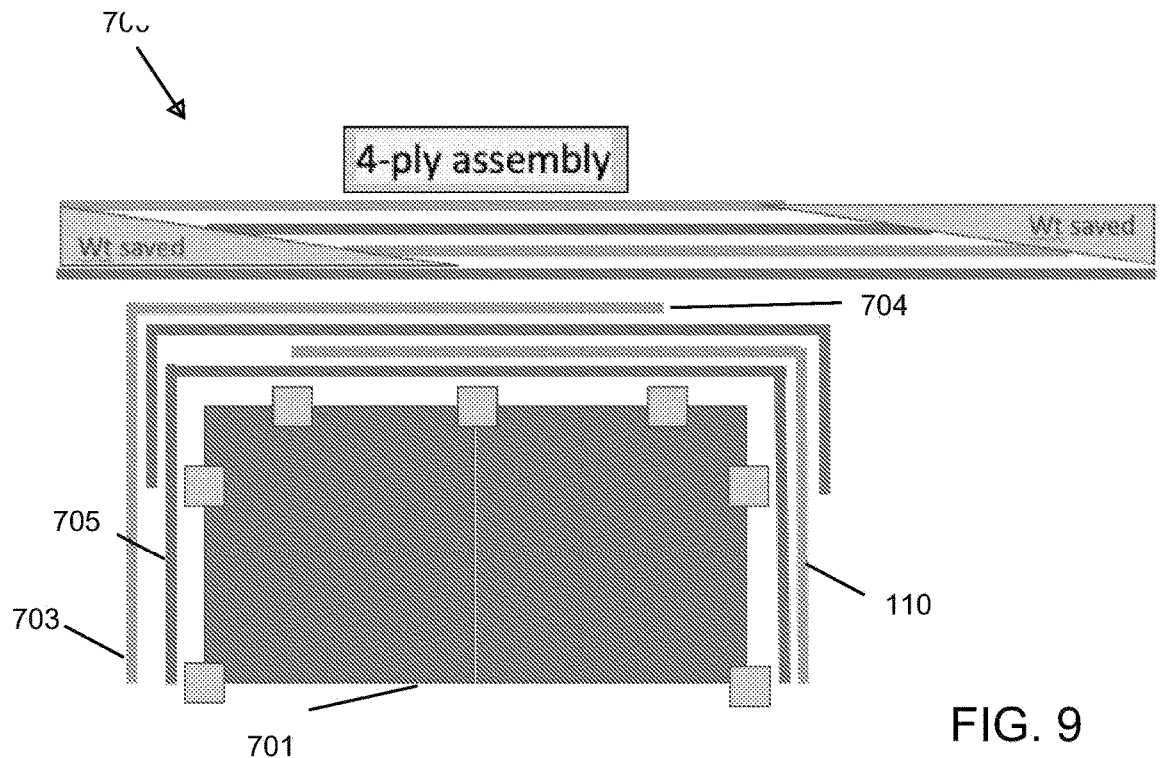
FIG. 9 shows an exemplary tapered fuselage tank utilizing a four-ply assembly of stacked, slid, and bent composite laminate cards according to various embodiments.

With reference first to FIG. 9, illustrated therein is a four-ply assembly 700 that is illustrated in a cross-sectional view, as compared to the view of the similar tapered stringer of FIG. 7. The four-ply assembly 700 generally represents a composite laminate structure (comparable to that of structure 100 described elsewhere herein), but for application as a fuel tank 701 cover. As compared to the tapering described above with respect to FIG. 7, that here may be such that the thinnest or end portions 703 have a minimum of two plies, such that one of the two plies or cards 110 on either side are not the same as that on the other side of the fuel tank cover (compare the green and orange cards, slid relative to one another). In certain embodiments, as illustrated, an innermost continuous card or layer 705 may be provided, having differing dimensions and characteristics than the remaining cards of the same size. A central, constant thickness (and thickest) portion 704 of the composite laminate cover of the fuel tank 701 may be thus achieved. As should be understood, as with the configuration of FIG. 7, in addition to sliding of the discrete cards (illustrated green, purple, orange, and blue in FIG. 9), manipulation (e.g., bending) of the card layers may also occur, so as to conform the formed laminate structure to a shape, whether that be flat, tubular or tank-like.

Figure 10:
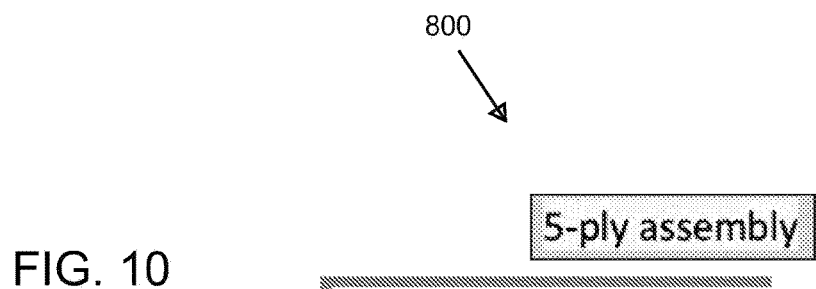
FIG. 10 shows an exemplary tapered fuselage tank utilizing a five-ply assembly of stacked, slid, and bent composite laminate cards according to various embodiments.

FIG. 10 illustrates an additionally exemplary embodiment, which is a five-ply assembly 800 for a fuel tank 801 cover. Details of this embodiment are substantially the same as those described with respect to FIG. 9, with centrally thicker portions tapering to thinner opposing ends of the cover, coupled with a continuous interior layer upon which respective card layers are stacked and slid (relative to one another). The stacking and sliding techniques for the embodiment of FIG. 10 (and FIG. 9) are substantially the same as those described elsewhere herein with respect to cards 110. A constant offset surface (see offset surface 150 by comparison) is provided between the respective card layers, moving from one opposing end of the cover to the other. Percentage weight saved is also illustrated in both figures, with reference also to the discussion of weight savings elsewhere herein, regarding also FIGS. 4-5 and 7-8.

Figure 11:
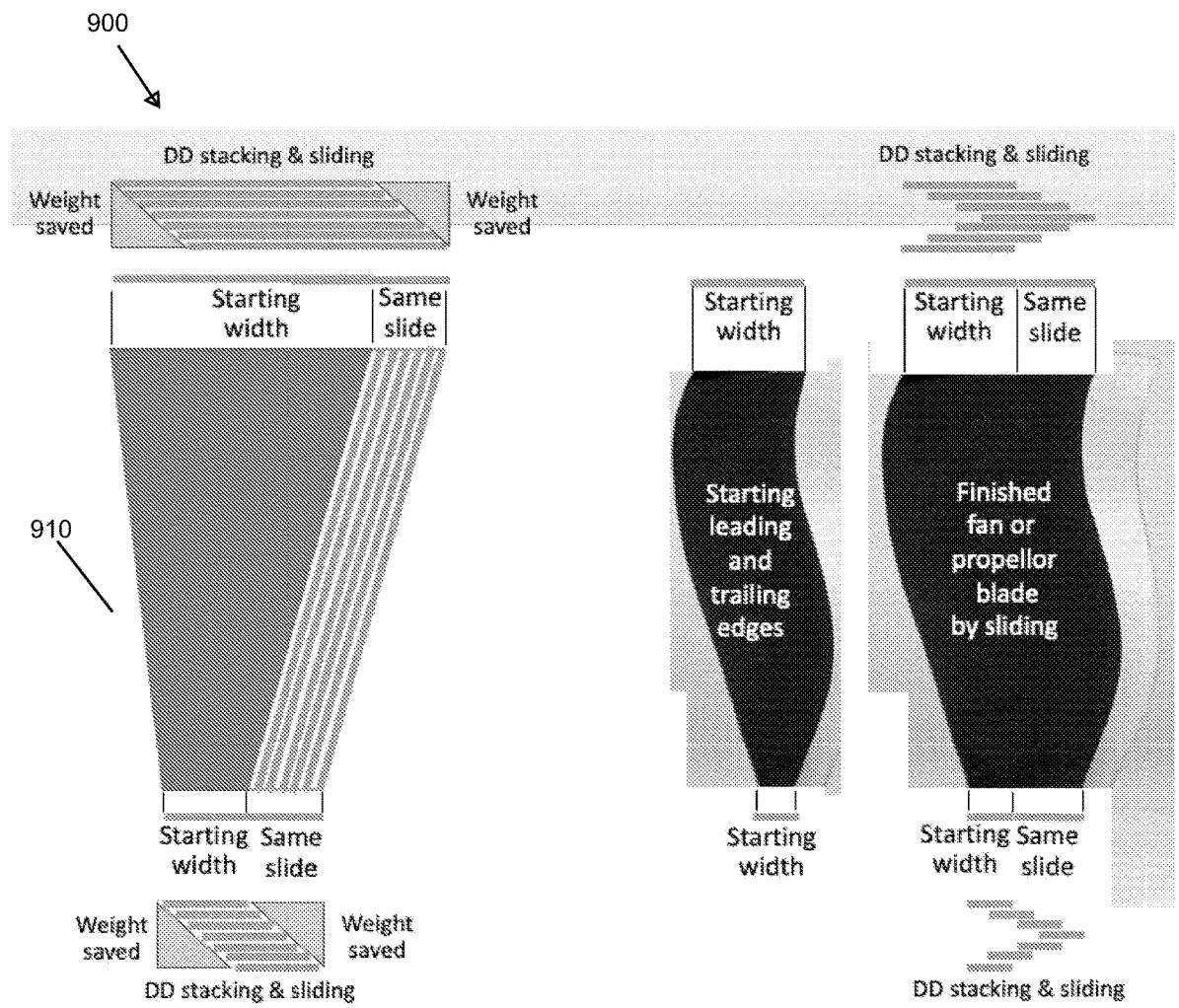
FIG. 11 shows an exemplary non-rectangular-shaped set of composite laminate cards stacked and slid so as to form a composite laminate structure according to various embodiments.

With reference to FIG. 11, by way of comparison to the rectangular or otherwise square-shaped cards 110 described elsewhere herein, illustrated in this figure is a non-linear composite laminate structure 900 formed from a set of non-linear (e.g., substantially trapezoidal) shaped cards 910. It should be understood that the card stacking and sliding configurations, inclusive of the techniques described elsewhere herein with respect to composite laminate structures 100 and cards 110, apply equally to the structure and cards illustrated in FIG. 11. Repetition of various characteristics of the structures and/or cards is thus not reproduced here. Exemplary applications, though, for the non-linear (e.g. substantially trapezoidal) cards 910 may include, as non-limiting options, bulkheads, conical shells, and/or aircraft wings (e.g., tapered leading and trailing edges).

The offset surface may be, as illustrated in FIG. 11, such that the same degree of slide is provided between adjacently stacked cards 910, which may be achieved in certain embodiments by having a linear offset throughout. It should be understood, of course, that non-linear offsets—while more complex—could also be provided. The trapezoidal shaped cards 910 may also, as illustrated, have a linear variation in width, from the uppermost starting width (as illustrated) to the lower-most starting width (also as illustrated). Non-linear variations may also be provided, which are particularly useful for bulkhead and/or conical shell applications.

Variable sections for stiffness may also be provided via the stacking and sliding techniques illustrated using the cards 910 of FIG. 11. As compared to starting leading and trailing edges (illustrated centrally), finished fan or propellor blades configurations (illustrated far right) may also be achieved. As evident from FIG. 11, weight saved is also comparable to that saved in other embodiments described herein and thus not reiterated here in duplicate (see FIGS. 4-5 and 7-10). For example, with tapered leading and trailing edges, weight reduction of up to 62.5% may be realized, such that loss of material properties (i.e., stiffness, flexibility, etc.) are kept to a minimal along an exemplary wing axis.

Conclusion

Described throughout herein have been various exemplary applications of various embodiments of the composite laminate structures 100 that may be formed using specific techniques for stacking and sliding a set of cards 110. These include, as non-limiting examples, automobile leaf springs, tapered fuselage skins, tapered stringers, tapered stiffeners, tapered fixed or unfixed beams (whether for truck trailer, vehicle chassis, or other applications), tapered ribs, blades (turbine, helicopter), bulkheads, conical shells, boat masts, utility/lighting poles, traffic poles or signs, canister, telescopic tubes, and the like. The described structures and techniques are also application for cylinders, like the cowl and containment ring of a gas turbine engine, whereby leading and trailing edges may be tapered and save weight, accomplished with ease while also reducing free edge delamination and avoiding added rim reinforcement conventionally required prevent edge delamination.

To reiterate, all the above-emphasized and exemplary applications can be accomplished with sliding of pre-engineered building block sub-laminates or fabric of equal shape and size instead of variable sizes for each layer. The layup by sliding will be, in certain embodiments, the simplest and fastest, while also being the least prone to error. All plies are visible from the outer surface for inspection, and all layers inside are free of interruption by ply drops, resin pockets, wrinkled plies, and less chances of warpage. Ease in processing, in compaction and resin infiltration, along with overall quality of the cure component can be expected. Again, these applications are provided as non-limited examples and should not be considered exhaustive embodiments utilizing the cards, laminate structures, and techniques described herein.

Still further, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A dual-tapered composite laminate structure, the structure having a longitudinal axis and comprising:
a plurality of finite sub-laminate cards, each card of the plurality of cards having the same shape and size as the other ones of the plurality of cards and having opposing planar surfaces oriented in a single card plane, opposing primary edges of the opposing planar surfaces, and opposing secondary edges of the opposing planar surfaces, the opposing secondary edges being perpendicular to the opposing primary edges;
a top surface defined by an uppermost one of the plurality of finite sub-laminate cards; and
a tool surface defined by a lowermost one of the plurality of finite sub-laminate cards, the tool surface being oppositely oriented relative to the top surface;
wherein:
each of the plurality of cards is stacked atop adjacently positioned cards of the plurality of cards in a direction orthogonal to the opposing planar surfaces and the opposing primary and secondary edges of the plurality of cards;
each of the plurality of cards is offset an offset distance in the card plane relative to an adjacently positioned card of the plurality of cards;
the offset distance is defined as a distance between respective ones of the opposing primary edges of the opposing planar surfaces of adjacently positioned cards of the plurality of cards;
one of the opposing primary edges of the opposing planar surfaces of adjacently positioned cards of the plurality of cards defines a top tapered portion of the top surface of the composite laminate structure;
the other of the opposing primary edges of the opposing planar surfaces of adjacently positioned cards of the plurality of cards defines a tool tapered portion of the tool surface of the composite laminate structure, the tool tapered portion being oppositely oriented relative to the top tapered portion,
each card of the plurality of cards contains four distinct ply layers; and
two of the four distinct ply layers within each card of the plurality of cards are offset at an angle relative to another two of the four distinct ply layers, the angle being between 22 and 70 degrees.

2. The structure of claim 1, wherein each card of the plurality of cards is substantially rectangular-shaped.

3. The structure of claim 1, wherein at least one of:
at least a portion of each card of the plurality of cards is quasi-trapezoidal-shaped; or
a taper of each of the trapezoidal-shaped cards is linear.

4. The structure of claim 1, wherein the offset distance is one of:
between $1/8$ and 1.0 inches;
between $1/4$ and $3/4$ inches;
between $1/4$ and $1/2$ inches;
between 0.01 and 4.0 inches; or
between $1/16$ and $1/8$ inches.

5. The structure of claim 1, wherein the offset distance is the same for at least two adjacently positioned cards of the plurality of cards.

6. The structure of claim 1, wherein the offset distance varies linearly.

7. The structure of claim 1, wherein the offset distance variably increases from a lowermost to an uppermost of the adjacently positioned cards of the plurality of cards.

8. The structure of claim 1, further including a continuous card having at least one of a shape or size different than the shape or size of the cards of the plurality of cards.

9. The structure of claim 1, wherein a length of the top tapered portion in the direction of the longitudinal axis of the structure is $1/4$ to $1/2$ a length of the structure in the longitudinal direction.

10. The structure of claim 1, wherein a length of the tool tapered portion in the direction of the longitudinal axis of the structure is $1/4$ to $1/2$ a length of the structure in the longitudinal direction.

11. The structure of claim 1, wherein a length of both the top and the tool tapered portions in the direction of the longitudinal axis of the structure is $1/3$ a length of the structure in the longitudinal direction.

12. The structure of claim 1, wherein an un-tapered portion is provided, along the longitudinal axis, intermediate the top and the tool tapered portions.

13. The structure of claim 12, wherein the un-tapered portion has a length in the direction of the longitudinal axis of the structure that is $1/4$ to $1/3$ a length of the structure in the longitudinal direction.

14. The structure of claim 1, wherein a weight savings of at least 50% are achieved relative to an un-tapered structure of constant thickness throughout.

15. The structure of claim 1, wherein the offset distance is a first offset distance and a second offset distance is also provided, the second offset distance being defined as a distance between respective ones of the opposing secondary edges of the opposing planar surfaces of adjacently positioned cards of the plurality of cards, so as to provide a two-dimensional tapering of the opposing top and tool surfaces of the structure.

16. The structure of claim 15, wherein one of the first and second offset distances is variable.

17. The structure of claim 1, wherein the structure is one of:
a tapered stiffener or stringer;
a tapered fuselage skin
a fuel tank cover having one interior continuous layer adjacent the plurality of cards; or
a tapered aircraft wing.

18. A method of forming a dual-tapered composite laminate structure having a longitudinal axis, the method comprising the steps of:
providing a plurality of finite sub-laminate cards, each card of the plurality of cards having the same shape and size as the other ones of the plurality of cards and having opposing planar surfaces oriented in a single card plane, opposing primary edges of the opposing planar surfaces, and opposing secondary edges of the opposing planar surfaces, the opposing secondary edges being perpendicular to the opposing primary edges;

establishing a tool surface by positioning of a first card of the plurality of cards in a direction aligned with the longitudinal axis of the structure to be formed;

stacking at least a second card of the plurality of cards atop the first card of the plurality of cards, the stacking occurring in an offset manner, so that at least opposing primary edges of the second card do contact the first card;

stacking a last card of the plurality of cards atop the at least second card of the plurality of cards in the offset manner so as to define a top surface of the structure, wherein: each of the plurality of cards is stacked atop adjacently positioned cards of the plurality of cards in a direction orthogonal to the opposing planar surfaces and the opposing primary and secondary edges of the plurality of cards;

the offset distance is defined as a distance between respective cards of the opposing primary edges of the opposing planar surfaces of adjacently positioned cards of the plurality of cards;

one of the opposing primary edges of the opposing planar surfaces of adjacently positioned cards of the plurality of cards defines a top tapered portion of the top surface the composite laminate structure;

the other of the opposing primary edges of the opposing planar surfaces of adjacently positioned cards of the plurality of cards defines a tool tapered portion of the tool surface of the composite laminate structure, the tool tapered portion being oppositely oriented relative to the top tapered portion, each card of the plurality of cards contains four distinct ply layers; and two of the four distinct ply layers within each card of the plurality of cards are offset at an angle relative to another two of the four distinct ply layers, the angle being between 22 and 70 degrees.

19. The method of claim 18, wherein one of:

the last card of the plurality of cards is a sixteenth of the plurality of cards and fourteen cards are sequentially stacked with successive offset distances between the first and the last cards of the plurality of cards; or the last card of the plurality of cards is an eighth of the plurality of cards and six cards are sequentially stacked with successive offset distances between the first and the last cards of the plurality of cards.

20. The method of claim 18, wherein the offset distance is a first offset distance and a second offset distance is also provided, the second offset distance being defined as a distance between respective ones of the opposing secondary edges of the opposing planar surfaces of adjacently positioned cards of the plurality of cards, so as to provide a two-dimensional tapering of the opposing top and tool surfaces of the structure.

21. The method of claim 20, wherein one of the first and second offset distances is variable.

22. The method of claim 18, wherein either:

the offset distance achieved via the offset stacking of the plurality of cards is the same for all adjacently positioned cards of the plurality of cards; or the offset distance achieved via the offset stacking is different for at least two adjacently positioned cards of the plurality of cards.

23. The method of claim 18, further including stacking a continuous card having at least one of a shape or size different than the shape or size of the cards of the plurality of cards adjacent an exterior card of the plurality of cards.

* * * * *